United States Patent [19]
Yamada et al.

[11] Patent Number: 5,388,230
[45] Date of Patent: Feb. 7, 1995

[54] PARALLEL PROCESSOR HAVING MULTI-PROCESSING UNITS EITHER CONNECTED OR BYPASSED IN EITHER SERIES OR PARALLEL BY THE USE OF BUS SWITCHING

[75] Inventors: Hiromichi Yamada, Hitachi; Koyo Katsura, Hitachiohta, both of Japan

[73] Assignee: Hitachi, Ltd., Tokyo, Japan

[21] Appl. No.: 104,945

[22] Filed: Aug. 12, 1993

Related U.S. Application Data

[63] Continuation of Ser. No. 369,252, Jun. 20, 1989, abandoned.

[30] Foreign Application Priority Data

Jun. 23, 1988 [JP] Japan .................................. 63-155200

[51] Int. Cl.$^6$ ....................... G06F 13/40; G06F 13/00
[52] U.S. Cl. .................................... 395/325; 395/800; 364/238.1; 364/238.2; 364/238.3; 364/238.4; 364/229
[58] Field of Search ............... 395/275, 325, 200, 250, 395/800

[56] References Cited

U.S. PATENT DOCUMENTS

| | | | |
|---|---|---|---|
| 4,271,466 | 6/1981 | Yamamoto et al. | |
| 4,310,879 | 1/1982 | Pandeya . | |
| 4,381,543 | 4/1983 | Bunten, III et al. | 395/375 |
| 4,396,978 | 8/1983 | Hammer et al. | 395/325 |
| 4,458,313 | 7/1984 | Suzuki et al. | |
| 4,574,345 | 3/1986 | Konesky . | |
| 4,633,388 | 12/1986 | Chiu | 395/375 |
| 4,701,870 | 10/1987 | Mogi et al. | 364/580 |
| 4,748,560 | 5/1988 | Kataoka | 395/325 |
| 4,914,625 | 4/1990 | Billian | 395/775 |
| 4,933,838 | 6/1990 | Elrod | 395/325 |
| 4,947,478 | 8/1990 | Maeno | 395/325 |
| 4,967,340 | 10/1990 | Dawes . | |
| 5,117,494 | 5/1992 | Costes et al. | 395/575 |

FOREIGN PATENT DOCUMENTS

| | | |
|---|---|---|
| 0225022 | 6/1987 | European Pat. Off. . |
| 53-132231 | 11/1978 | Japan . |
| 60-107169 | 6/1985 | Japan . |
| 62-180456 | 8/1987 | Japan . |
| 62-241045 | 10/1987 | Japan . |
| 63-155200 | of 1988 | Japan . |

OTHER PUBLICATIONS

NTIS Tech Notes; "Linking Smart Modules by a Single Channel" No. 7, Jul. 1984; Springfield, Va.; pp. 500–501.
Mannherz; "Electronic data path separation"; IBM Technical Disclosure Bulletin; vol. 24, No. 12, May 1982, New York pp. 6496–6497.
Japanese's Abstract; "Bus Switching Device"; vol. 8, No. 31 (P-253), (1468) 9 Feb. 1984; JP-A-58 184628.
Japanese's Abstract; "Data Channel"; JP-A-59 144933; vol. 8, No. 278 (P-322) (1715) 19 Dec. 1984.

*Primary Examiner*—Parshotam S. Lall
*Assistant Examiner*—Krisna Lim
*Attorney, Agent, or Firm*—Antonelli, Terry, Stout & Kraus

[57] ABSTRACT

A parallel process which includes a plurality of processing units connected to each other via input/output ports. Each of the plurality of processing units includes a memory for storing a program and data, a local bus for inputting/outputting the program and data to and from the memory having an address signal line, a data signal line, and a control signal line, a CPU for reading the program from the memory via the local bus, reading data needed to execute the program from the memory via the local bus, and storing data which has been updated due to the execution of the program in the memory via the local bus, and a plurality of input/output ports for connecting the local bus to a plurality of outside buses. The input/output ports are used by the CPU to input/output data to and from an outside memory connected to an outside bus or by an outside CPU, connected to an outside bus, to input/output data to and from the memory. At least one bypass switch is provided for controllably connecting two of the outside buses to permit data transference between the outside CPU and the outside memory thereby bypassing the CPU and the memory. Also provided is a main CPU for setting program and data in the processing units and recovering data from the processing units.

5 Claims, 11 Drawing Sheets

○: PROCESSOR

PARALLEL PROCESSOR HAVING MULTI-PROCESSING UNITS EITHER CONNECTED OR BYPASSED IN EITHER SERIES OR PARALLEL BY THE USE OF BUS SWITCHING

This application is a continuation of application Ser. No. 07/369,252, filed on Jun. 20, 1989, now abandoned.

BACKGROUND OF THE INVENTION

1. Field of the Invention

The present invention relates to a parallel processor, and more particularly to a parallel processor suitably used for a graphic job.

2. Background Art

Hitherto, there is a processor system in which a plurality of processors each of which includes, for example, a CPU and a local memory are connected to a common bus, wherein a CPU in a certain processor performs writing and reading a local memory in one of the other processors through the common bus.

Another system is known which includes a plurality of common buses and transference of data between processors are individually performed. A still further known system is arranged such that a plurality of processors are connected annularly, in the form of a lattice, or a binary tree. In addition, a system is known which is arranged in such a manner that communication is performed between processors connected vertically and laterally, that is so-called "a CAP (Cellular Array Processor)" is formed.

However, in any one of the above-described processor systems, the connection established between processors is fixed. Therefore, although specific processings can be performed at high speed, a problem arises in that it is difficult for the systems to correspond to the change in the algorithm, causing their use to be limited.

To this end, an object of the present invention is to provide a parallel processor in which the connections between a plurality of processors can be re-structured in accordance with the processing algorithm and various processings can be performed at high speed by means of a parallel operation.

SUMMARY OF THE INVENTION

In order to achieve the above-described object, a parallel processor according to the present invention includes
a plurality of processing units connected to each other via input/output ports. Each of the plurality of processing units includes
a memory for storing programs and data;
a local bus for inputting/outputting the program and data to and from the memory and consisting of an address signal line, a data signal line, and a control signal line;
a CPU for reading the program from the memory via the local bus as to process the program, reading data needed to perform the processing from the memory via the local bus, and making data which has been updated due to the processing to be stored again by the memory via the local bus;
a plurality of input/output ports capable of connecting the local bus to a plurality of outside buses and needed for the CPU to input/output data to and from an outside memory other than the memory or for an outer CPU to input/output data to and from the memory; and
bus switches for connecting two of the outside buses the purpose of enabling for data transference between the CPU and the memory which are disposed on individual buses to be performed, wherein a main CPU for setting program and data in the processing units connected to each other and for recovering data and the processing units connected to each other are connected to each other via at least one input/output port of the processing unit.

Furthermore, a processing unit according to the present invention includes
a memory for storing programs and data;
a local bus for inputting/outputting said program and data to and from said memory and consisting of an address signal line, a data signal line, and a control signal line;
a CPU for reading said program from said memory via said local bus as to process said program, reading data needed to perform said processing from said memory via said local bus, and making data which has been updated due to said processing to be stored again by said memory via said local bus;
a plurality of input/output ports capable of connecting the local bus to a plurality of outside buses and needed for the CPU to input/output data to and from an outside memory other than said memory or for an outer CPU to input/output data to and from the memory; and
bus switches for connecting two of the outside buses for the purpose of enabling data transference between the CPU and the memory which are disposed on individual buses to be performed.

As a result of the above-described structure, arrangement of the processor units, specifying of the state where the bus switches of the processor units due to the thus-formed arrangement and connections of the processor units can be achieved. Furthermore, these connections can be structured in accordance with the processing algorithm. Therefore, various processings can be conducted at high speed by a parallel operation.

DESCRIPTION OF THE PREFERRED EMBODIMENT

Figure 1:
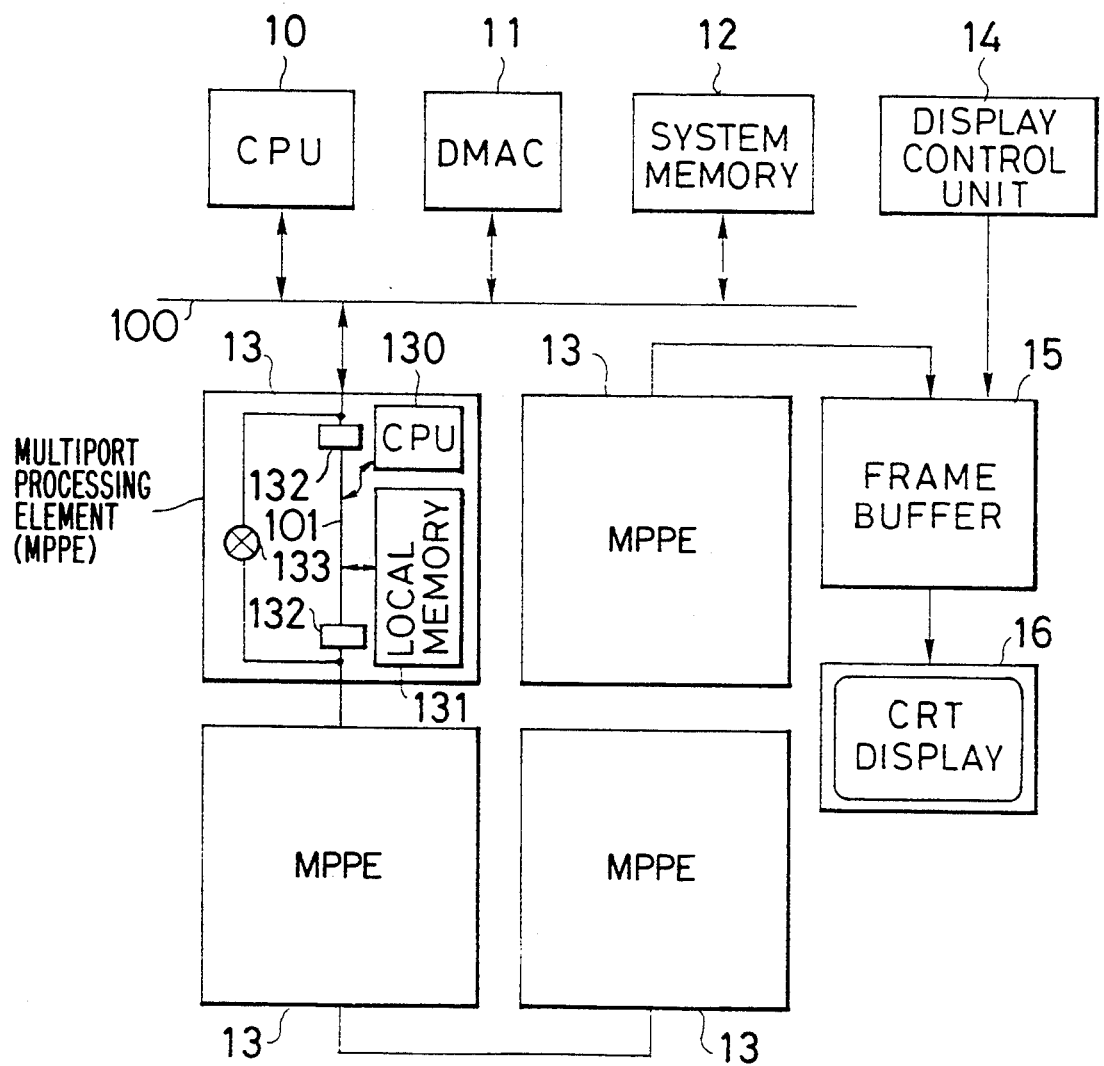
FIG. 1 is a block diagram which illustrates an embodiment of a parallel processor according to the present invention.

FIG. 1 is a view which illustrates an example of a parallel processor according to the present invention. Referring to this drawing, a CPU 10, a DMAC 11, and a system memory 12 are respectively connected to a common bus line 100. Four multiport processing elements (to be called "MPPEs" hereinafter) 13 connected in parallel to each other are connected to this bus line 100. A frame buffer 15 is connected to an MPPE 13 which is disposed rearmost of the configuration of the four MPPEs 13. A CRT display 16 is connected to an end of this frame buffer 15, while a display control unit 14 is connected to another end of the same. The above-described MPPE 13 comprises two input/output ports as to be used with its ports connected to corresponding ports of another MPPE 13 of the same type. Although four MPPEs 13 are used according to the present invention, the number of the MPPEs is not limited. Although the number of the input/output ports of the MPPE 13 is determined to be two with reference to the drawing, the number of the input/output ports can also be optionally determined. In the MPPE 13 shown in FIG. 1, a CPU 130 and a local memory 131 are connected to the common bus 101, and input/output ports 132 are respectively connected to this common bus at positions outside the corresponding intersections of the CPU 130 and the local memory 131. In addition, a bus switch 133 enabling the outsides of the input/output ports 132 to be connected to each other is included in the MPPE 13. The above-described CPU 130 performs a predetermined processing in accordance with a program stored in the local memory 131. Data which has been processed is stored in the local memory 131. In a case where it is impossible for a single MPPE 13 to complete the processing, the other MPPE 13 is accessed via the input/output port 132. The structure is so arranged that addresses, data, and control signals can be transported between the ports of the MPPEs 13. That is, the MPPE 13 can access the local memory 131 or consign the processing to the other CPU 130 of the other MPPE 13. As described above, the bus switches 133 in the MPPEs 13 are provided for the purpose of controlling the connections between the input/output ports 132. A fact whether this switch 133 is opened or closed is arranged to be determined on the basis of a value of the register in the bus switch 133. This value is determined by way of assignment of the register number performed by the CPU 130 on the basis of the program to be determined by the CPU 10 and processed by the MPPE 13. When the MPPE 13 is accessed from outside and the bus switch 133 is closed, information obtained from the input/output port 132 is supplied from the other input/output port to the other MPPE 13 via the bus switch 133. This indicates a fact that the relative connections between the CPUs 130 of the MPPE system can be varied by changing the state of the bus switches of the MPPEs 13 in view of the system. Picture element data which has been processed by the MPPE 13 is stored in a frame buffer 15. The data stored in the frame buffer 15 is read by the display control unit 14 so that an image is displayed on the above-described CRT display 16.

Figure 2:
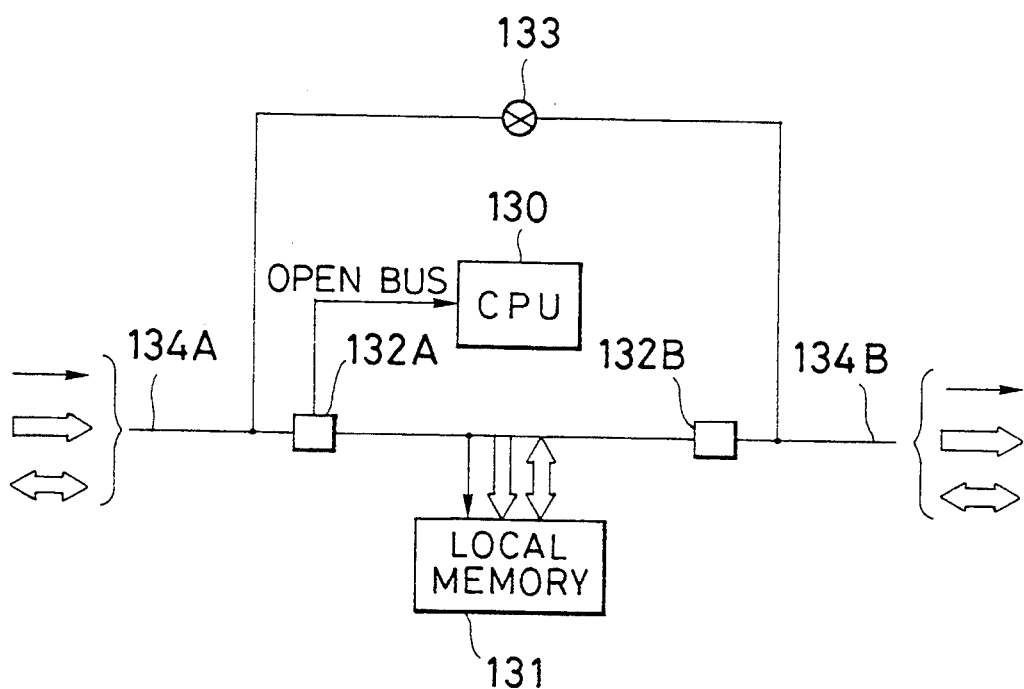
FIG. 2 is a view which illustrates an internal block of a multiport processing element (MPPE) and an access to a local memory from an outside MPPE.

FIG. 2 is a view which illustrates an access from outside to the local memory in the above-described MPPE 13. The control information, address, and data are input through an input/output port 132A. When the bus switch 133 is set to be closed, the information above is immediately transferred to the other MPPE 13 connected to another input/output port 132B through this input/output port 132B. The input/output port 132A decodes the control information and the address which have been input to the input/output port 134A. In the case where the thus-input control information and the address data are the access to the local memory 131 of the MPPE 13, the input/output port 132A issues a demand to the CPU 130 to open the bus. The CPU 130 opens the bus and as well acknowledge the input/output port 132A a fact that the bus has been opened. The input/output port 132A transfers the control information, address, and data to be input through the input/output port 134 to the local memory 131. On the contrary, when there is any access through the input/output port 134B, the input/output port 132B demands the CPU 130 to open the bus so that the control information, address, and data to be input through the input/output port 134B are transferred to the local memory 131.

Figure 3:
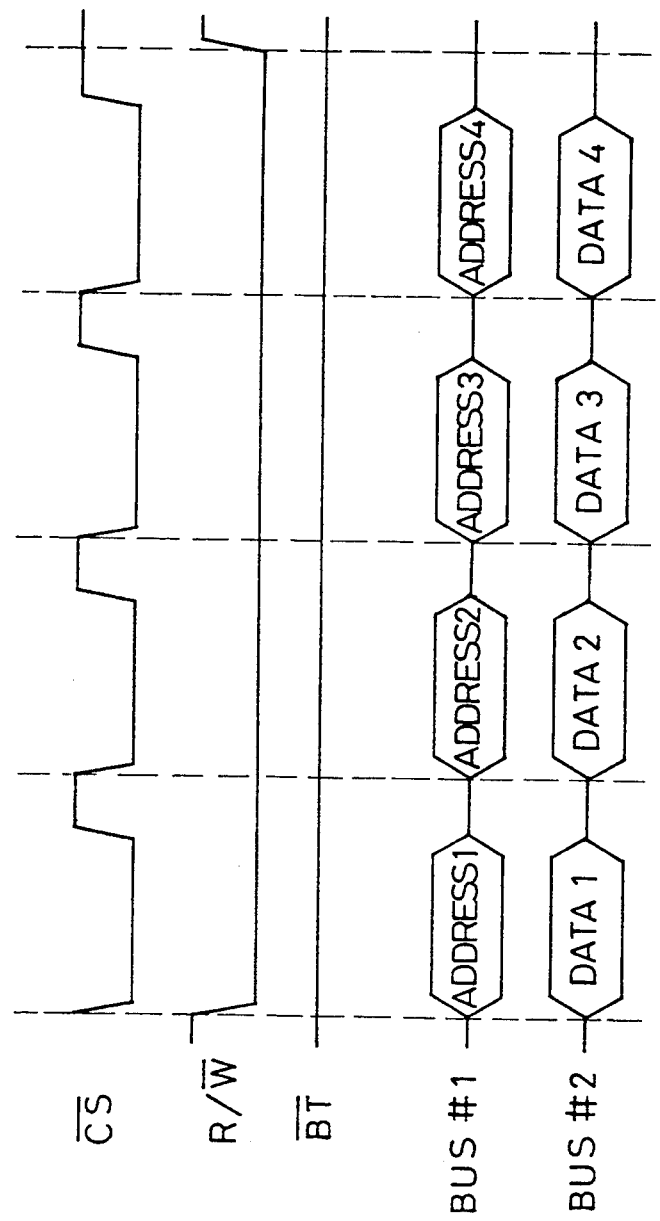
FIG. 3 is a time chart for use in a case where an access to the local memory by one word for one time is conducted.

FIG. 3 is a view which illustrates a time chart when an access to the local memory 131 of the MPPE 13 is performed, in which three types of control signals and two types of data are selected to be indicated from necessary signals for performing the access. These control signals and data are input through the input/output port 134A or 134B shown in FIG. 2, and are transferred to the local memory 131 through the input/output port 132A or 132B. Referring to FIG. 3, a control signal CS acts to realize a LOW level during a period in which data and address data are supplied to the local memory 131. A control signal R/W is a signal acting to distinguish whether data is read from the local memory or data is written in the same where the "HIGH" level means reading while the "LOW" level means writing. A control signal BT realizes a "LOW" level when data is simultaneously transferred from two types of buses BUS #1 and #2 to the local memory 131. In general, the BUS #1 is used for address transference, while the bus #2 is used for data transference. When data is accessed from the program data region of the local memory 131, an address is assigned every time in accordance with the access. When an access from the message region is performed, data about a plurality of words is transferred to successive addresses in the local memory 131, where the "message region" represents a memory region which is distinguished from the program data region by an address and which serves as means for storing an address in which the message transferred from the other MPPE 13 is written and the number of the messages are stored. A structure is formed such that the address of the access corresponding to the first word is assigned in response to an access from the message region, and a bus which is used for general address transference can be used for the data transference of the second word and ensuing words.

Figure 4:
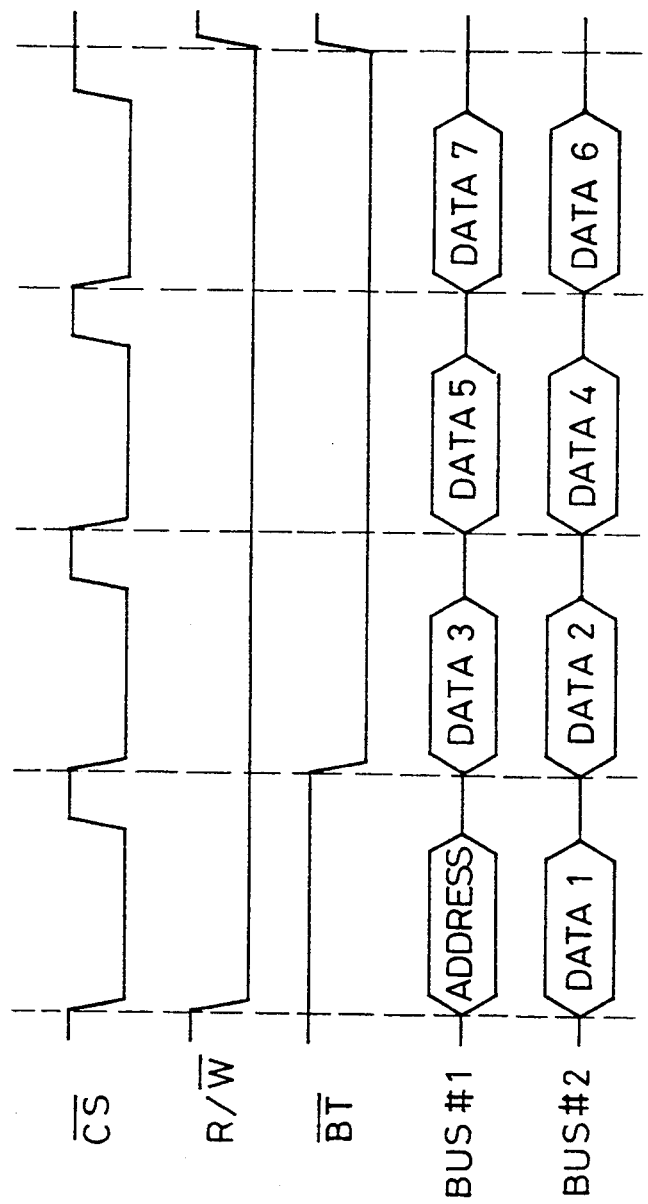
FIG. 4 is a time chart for use in a case where an access to the local memory by two words for one time is conducted.

FIG. 4 is a time chart which illustrates a mode in which two words are transferred between individual MPPEs 13 such that an address is assigned at the transference of the first word and the address bus is also used for the data transference from the second word and the ensuing word when CPU 10 transfers data of a plurality of words to the message region of the local memory 131. At the first access, the address in the local memory 131 in a specific MPPE 13 is transferred through the BUS #1, and at the second and the ensuing accesses both the BUS #1 and #2 are used to simultaneously transfer data for two words. In this time, the level of the control signal BT needs to be set to the LOW level. In addition, after the transference has been completed, both the control signals CS and BT needs to be set to the HIGH level.

Figure 5:
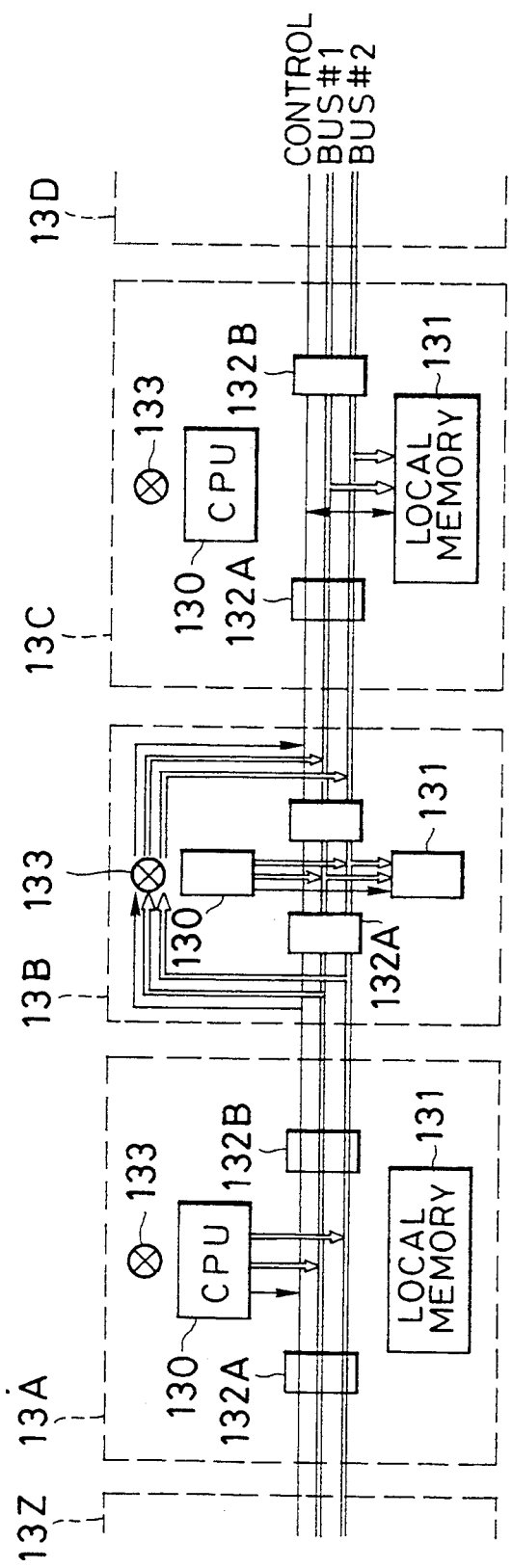
FIG. 5 is a block diagram for use in a case where an access to the local memory from an outside MPPE is conducted.

FIG. 5 is a view which illustrates an action of writing in the local memory of the CPU between individual MPPEs which are directly connected to each other.

This drawing illustrates a case where the CPU 130 in the MPPE 13A performs writing in the local memory 131 in the MPPE 13C. The bus switches 133 in the corresponding MPPEs 13A, 13B, and 13C are respectively programmed in the sequential order as OPEN, CLOSE, and OPEN. The control signal, address (BUS #1 is used), and data (BUS #2 is used) transmitted by the MPPE 13A are transferred to the MPPEs 13B and 13Z which are to be connected to the MPPE 13A via the input/output ports 132A and 132B of the MPPE 13A. In the MPPE 13B, the bus switch 133 is set to CLOSE so that the control signal, address, and data transmitted from the input/output port 132B of the MPPE 13A are immediately transferred to the MPPE 13C. The description about the action within the MPPE 13Z is omitted here. The input/output port 132A in the MPPE 13B determines by using an address decoder included therein whether or not the subject access is an access to the local memory 131. The address includes both the processor address and the local memory address. In this case, since it is not the access to the local memory 131 (in the MPPE 13B), the CPU 130 in the MPPE 13B can access the local memory 131. On the other hand, the input/output port 132A in the MPPE 13C determines, by using the address decoder provided therein, a fact that it is the access to the local memory 131 (MPPE 13C), and upon this determination the input/output port 132A in the MPPE 13C issues a demand toward the CPU 130 of the MPPE 13 for a bus. This CPU 130 issues a permission of use of the bus to the input/output port 132A (in the MPPE 13C) when the state in which the bus can be opened is realized. This input/output port 132A transfers the control signal, address, and data to the local memory 131 (in the MPPE 13C).

Figure 6:
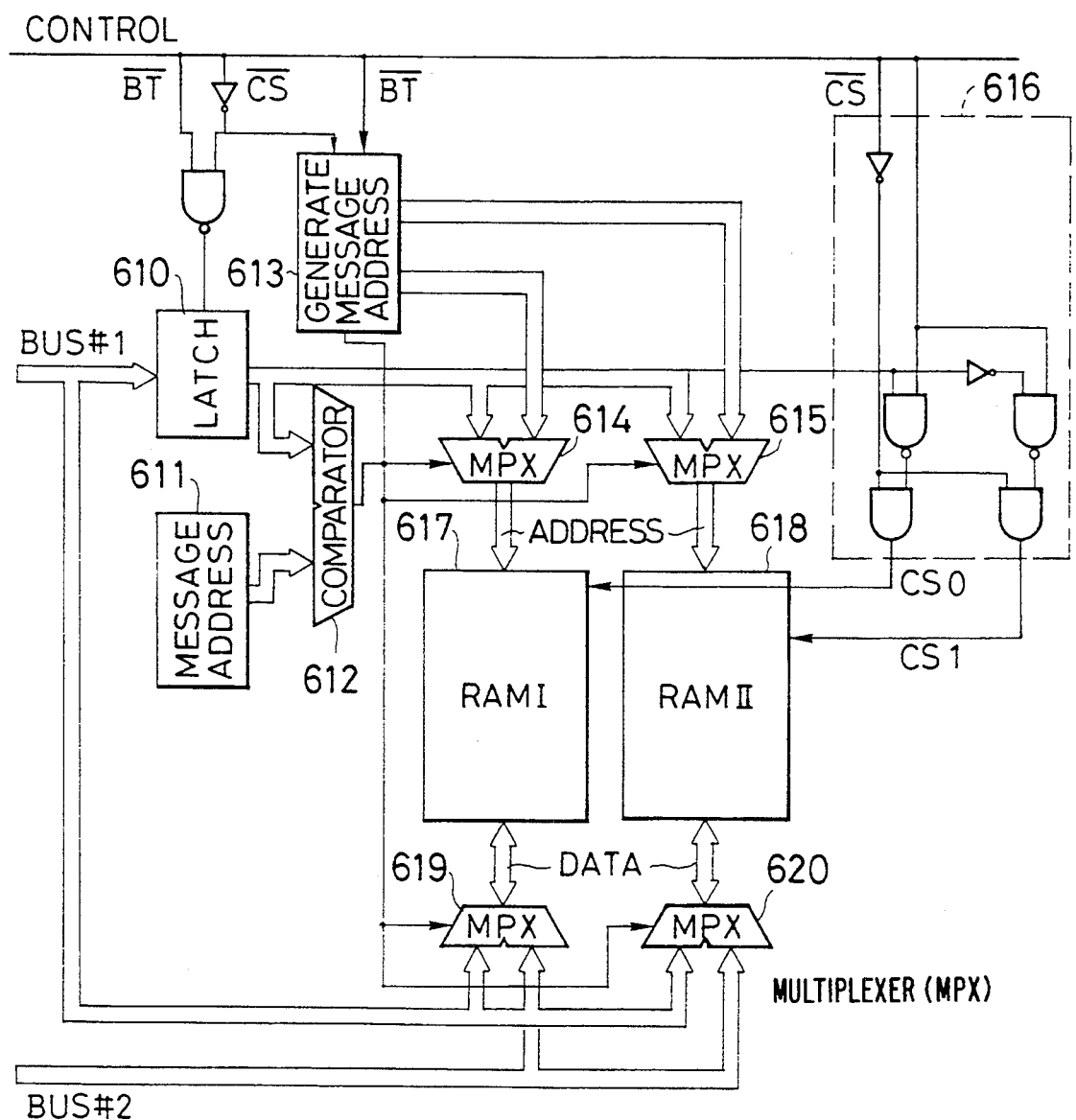
FIG. 6 is a structural view which illustrates an embodiment of a local memory to which an access by two words for one access can be conducted.

FIG. 6 is a view which illustrates the structure of the local memory which enables writing and reading of data for two words by its single access. Storage devices RAM I 617 and RAM II 618 perform writing and reading of a single word (the same bit size as that of the BUS #1 and #2) by their single accesses. The RAM I 617 corresponds to even-number addresses (the lowermost bit of the address is 0), while the RAM II 618 corresponds to the odd-number addresses (the lowermost bit of the address is 1). In the case where the subject access is the access to the program data region, the address on the BUS #1 is held by a latch 610, and is selected by multiplexers 614 and 615 as to be supplied to the RAM I 617 and RAM II 618. The detection of the access to the program and data region is performed by a comparator 612. In this case, the address space in the message region is stored in the register 611. One word is accessed to the program and data region for one time, and a chip select circuit 616 selects either the RAM I 617 or RAM II 618 in accordance with the lowermost bit of the address. The data is supplied from the BUS #2 to the RAM I 617 and RAM II 618 via multiplexers 619 and 620. As for the access to the message region, a message address generator 613 controls the address. Therefore, information for identifying one of a plurality of local memories and information expressing a message are of significant among the addresses generated by the outside MPPE. The messages are successively stored by one in the local memory starting from the front address. The message address generator 613 includes a register for storing an address to be supplied when writing of a message is performed from the outer MPPE and a register for storing the address of the most antiquated message which has not as yet be read by the CUP. A mode in which data for two words is transferred by one access is called a "block transference mode". This mode is distinguished from an access of one word for one access by making the control signal BT to be LOW level. In the block transference mode, when two words are successively transferred from an even address, the same address is supplied to the RAM I 617 and RAM II 618 via the multiplexers 614 and 615. Data is supplied from the BUS #2 to the RAM I 617, and is supplied from the BUS #1 to the RAM II 618. When two words are successively accessed from an odd address, an address which is added by one from the RAM II 618 for the odd address is supplied to the RAM I 617 for the even address. In this case, data is supplied from the BUS #2 to the RAM II 618, and is supplied from the BUS #1 to the RAM I 617.

Figure 7:
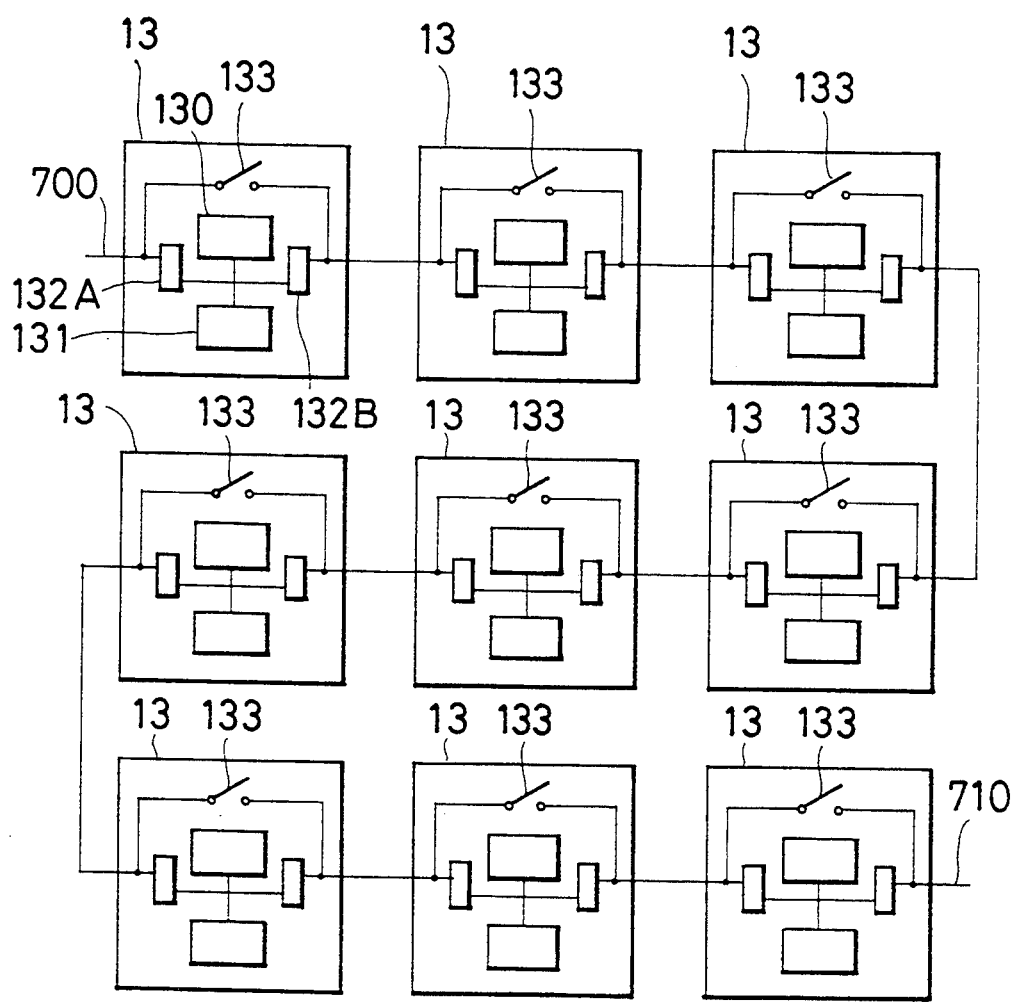
FIGS. 7 to 11 each illustrate a block diagram of another embodiment of the present invention.

A method to obtain the effect of the present invention by using the above-described MPPE will be described. FIG. 7 is a view which illustrates an embodiment in which 9 MPPEs are combined. Referring to this drawing, the bus switches 133 of the corresponding MPPEs 13 can determine their state of opening and closing in accordance with a program. According to this embodiment, all are set to OPEN. Data and its control instruction are input from the input/output terminal 700 through the input/output port 132A. These data items are not transferred to the ensuing MPPE 13 since the bus switch 133 is opened. When the CPU 130 applies a processing to this data and makes the ensuing MPPE 13 to perform the next processing, data is transferred via the input/output port 132A. By transferring data which has been newly generated to the next step after a processing has been applied by the MPPE 13 to this data received from the previous step, the data input through the input/output terminal 700 is subjected to a processing by means of the MPPE, that is, the 9-step pipe line processing, and is output from an input/output terminal 710.

Thus, entire processing to one data is equally divided into 9 portions, and each MPPE receives data, applies a processing by an amount of one ninth, and supplies it to the next MPPE. As a result, data can be output from the final MPPE only taking one ninth of the time lapse.

Figure 8:
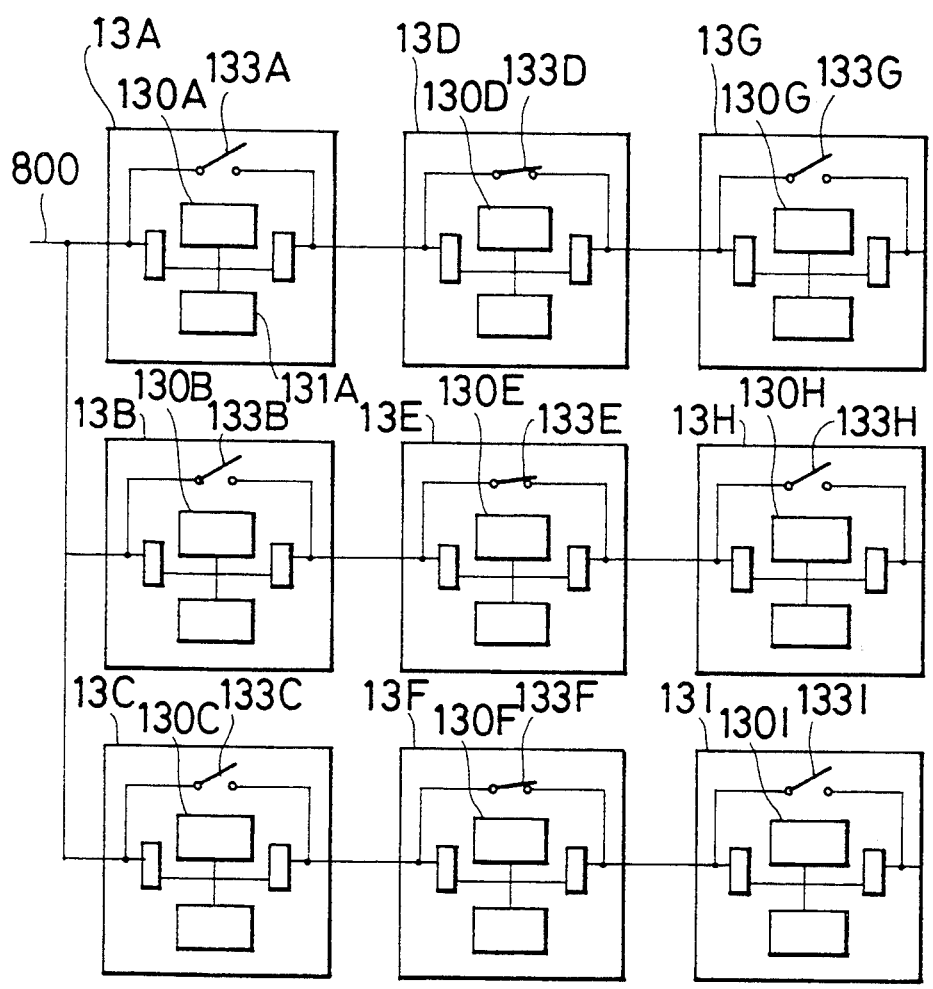

FIG. 8 is a view which illustrates another embodiment in which also 9 MPPEs are combined. Referring to this drawing, the MPPE 13A, 13B, and 13C have a common terminal 800 arranged such that either of two input/output terminal thereof is connected to each other. The MPPE 13A is connected to a MPPE 13D by an input/output terminal, and is capable of being connected also to a MPPE 13G by setting a bus switch 133D in the MPPE 130 to be closed. Similarly, MPPEs 13E and 13H are connected to the MPPE 13B, while MPPEs 13F and 13I are connected to the MPPE 13C.

In this case, two MPPEs are dependent-connected to the MPPE 13A, 13B, and 13C, respectively. As a result, such a structure is effective in a hierarchical distributed data transference.

Figure 9:
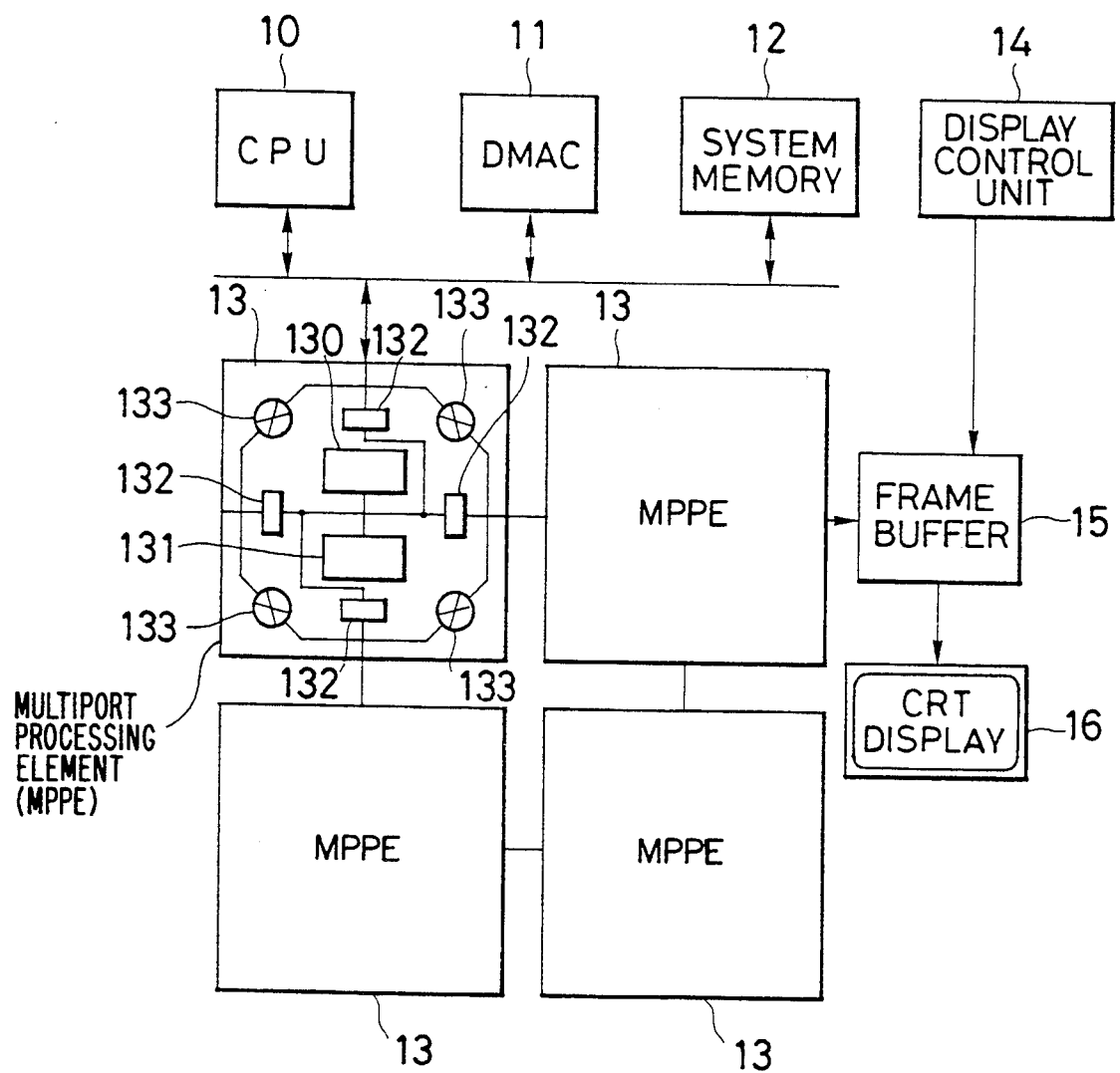

FIG. 9 is a view which illustrates an embodiment in which four MPPEs each having four input/output ports are combined. The CPU 10, the DMAC 11, and the system memory 12 are connected to the common bus line 100, the MPPE 13 is connected to this bus line 100, a frame buffer 15 is connected to this MPPE 13, and the display device 14 and the CRT display 16 are connected to this frame buffer 15. The MPPEs are connected to the upper, lower, right and left (when viewed in FIG. 9) MPPEs via ports. The MPPE comprises: the CPU 130 and the local memory 131 connected to the common bus; two input/output ports 132 each of which is connected to this common bus at a position outside the intersection of the local memory 131 and the CPU 130; and the bus switches 133 which enable the connections between the ports. By way of respectively programming the opening and closing of the bus switches for the corresponding MPPEs arranged to form a two dimensional grating, the CPUs 130 and the local memories 131 in the MPPEs can be connected to the upper, lower, right, and left MPPEs and as well be connected to the CPUs 130 and the local memories 131 in the neighboring MPPEs. By way of programming the connections of the bus switches, the connections between CPUs can be changed even if the same system structure is employed.

Figure 10:
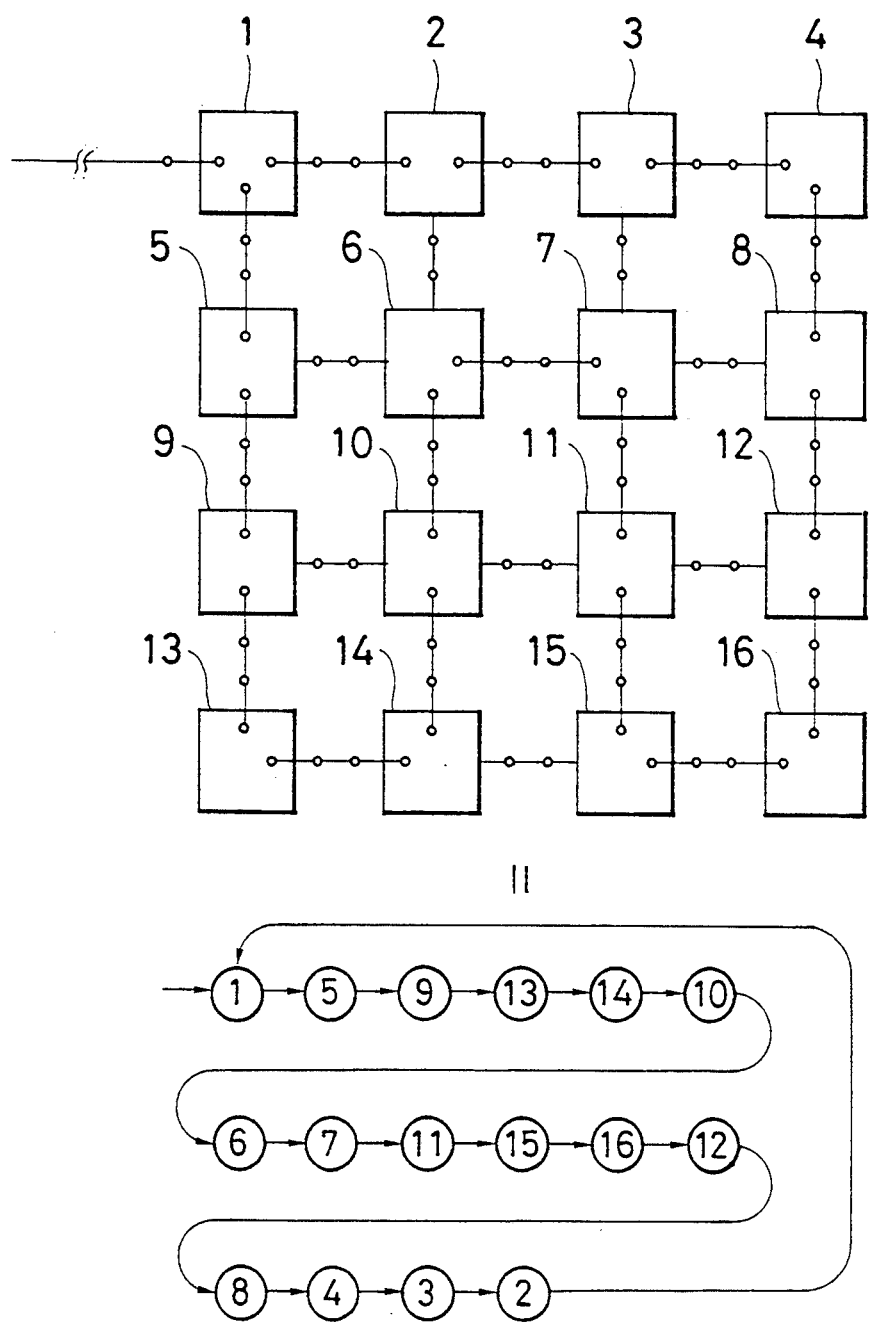

FIG. 10 is a view which illustrates an embodiment in which the ports of 16 MPPEs are connected in the form of a 4×4 grating. All of the bus switches of the MPPEs are made open, and the same data is processed in the sequential order as 1, 5, 9, 13, 14, 10, 6, 7, 11, 15, 16, 12, 8, 4, 3, and 2. The data which has been processed in the MPPE 2 is returned to the MPPE 1.

An effect of shortening the processing time which is similar to that in the embodiment shown in FIG. 7 can be obtained.

Figure 11:
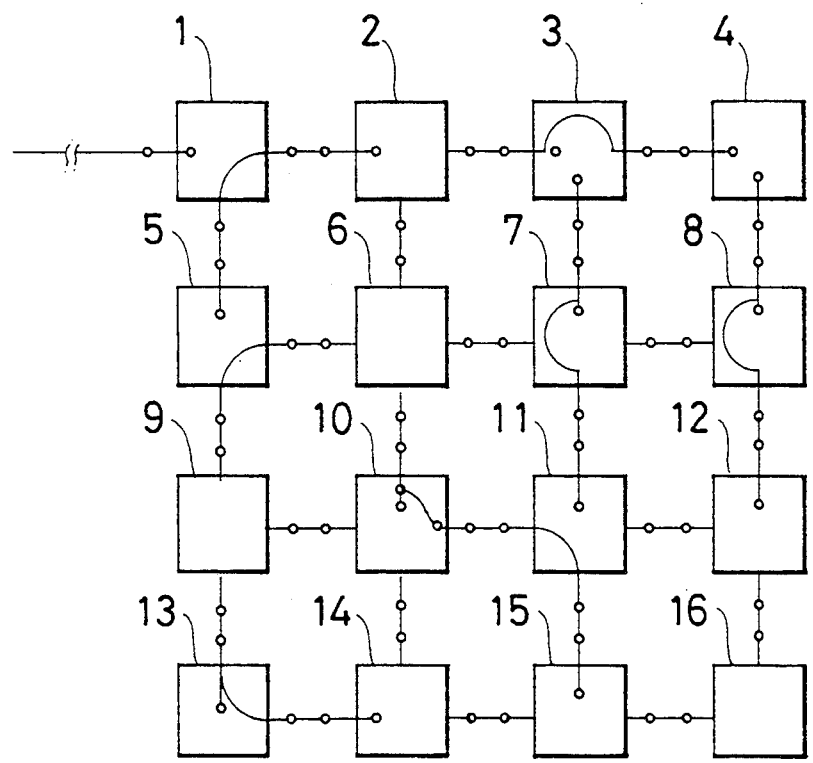
Figure 11:
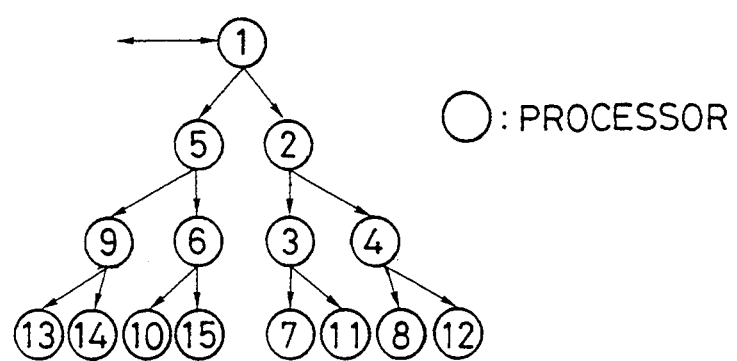

FIG. 11 is a view which illustrates an embodiment in which another program is given to the bus switch of the embodiment shown in FIG. 10 so that the processors are connected to a four-layered binary tree.

According to the above-described embodiment, a plurality of MPPEs are connected to each other with the terminals thereof so that data and a signal expressing the state of opening and closing of the bus switch of the MPPEs 13 are supplied from the main CPU to one of the MPPEs. Therefore, the ports of the MPPEs 13 are arranged to include means for opening and closing the above-described bus switches in response to the input signal (signal expressing the state of opening and closing of the bus switch).

The opening and closing of the bus switches of the MPPEs 13 may be arranged to be conducted in response to a signal representing an instruction to open/close the bus switches supplied directly from the main CPU (without passing though the ports). In this case, the opening and closing of the bus switches can be determined upon a comparison made between information stored in a register or the like provided in the bus switch and information about the signal representing an instruction to open/close the bus switches supplied from the main CPU by using this register or the like.

As described above, the number of the ports provided for the MPPE 13 may be arranged to be two or more. For example, a structure having four ports is provided with a first and a second data transference lines whose terminals are arranged to be the two ends of the signal lines such as bus lines and the like. In addition, there is provided a memory for storing a program and a data and a CPU for reading and processing the above-described data as to be stored in the above-described memory via the first and second transference lines in accordance with the program stored in the memory. Furthermore, there is provided: a bus switch disposed between a terminal of the first data transference line and each terminal of the second data transference line, and between another terminal of the first data transference line and each terminal of the second data transference line; and an input/output port disposed to each end portions of the first and second data transference lines. In this case, the above-described bus switch and the input/output port have the same structure and the function as those above.

As described above, the connections of the processors can be re-structured in accordance with the processing algorithm, and various processings can be performed at high speed by means of a parallel operation.

What is claimed is:

1. A parallel processor comprising a plurality of processing units connected to each other via input/output ports and a main CPU connected to at least one of said processing units to control said processing units, wherein each processing unit comprises:
a CPU,
a memory for storing data and programs to be executed by said CPU,
a local bus connected to said CPU and said memory,
a plurality of input/output ports, having a corresponding number of outside terminals, connected to said local bus within each of said processing units, said outside terminals being connected to outside buses external of each of said processing units, and
a bus switch for mutually connecting a pair of said outside terminals connected to a pair of said input/output ports, said pair of said input/output ports being a selected two of said plurality of input/output ports;

wherein at least one of said processing units having one of said outside terminals connected to one of the input/output ports has said at least one of said outside terminals connected via an outside bus to an input/output port of said main CPU, and the rest of said outside terminals of said at least one of said processing units are connected via outside buses to a corresponding number of said processing units such that there is at least a pair of said processing units connected in series;

wherein a selected pair of said outside terminals of said each of said processing units is connected to each other via said bus switch for bypassing said each of said processing units;

wherein said main CPU, having a function to modify an inter-relationship of connections between said plurality of processing units, controls said bus switch of any one of said processing units by opening and closing said bus switch to disconnect and connect, respectively, said outside buses of both sides of said bus switch via said bus switch, whereby any one of said processing units can be bypassed; and wherein said CPU of said each of said processing units reads said programs from said memory and processes according to a demand of said programs to access data of said memory and data of said memory within another processing unit connected in series or parallel with said each of said processing units.

2. A parallel processor according to claim 1, wherein said bus switch of each of said processing unit is provided with a register, and whether said bus switch should be opened/closed is determined by comparing information stored in said register with information supplied from said main CPU.

3. A parallel processor according to claim 2, wherein said register is so arranged that information stored therein can be rewritten on the basis of information supplied from said CPU in said processing unit belonging thereto.

4. A parallel processor according to claim 1, wherein said memory of each of said processing units is provided with a message region distinguished from a region storing said program and data in accordance with an address, to temporarily store a message supplied from outside of each of said processing units in said message region, each of said processing units is provided with a register for storing a front address and a number of said message stored in said message region, and said CPU of each of said processing units refers to said register at a constant time interval to read out and process said message from said message region if said message is stored in said message region.

5. A parallel processor according to claim 4, wherein in case of transferring a plurality of data constituting said message to said message region of said processing units connected in series or parallel, after transferring said front address of said plurality of data, said CPU of each of said processing units discards addresses of data after the second address of data and successively transfers said plurality of data including both a data bus and an address bus.

* * * * *